(12) United States Patent
Schön et al.

(10) Patent No.: US 7,557,477 B2
(45) Date of Patent: Jul. 7, 2009

(54) ELECTRIC MACHINE WITH INTEGRATED POWER ELECTRONICS AND METHOD FOR PRODUCING THE BOND OF THE DC BARS WITH THE DC CONTACTS SURFACES OF THE POWER SEMICONDUCTOR OF THE POWER ELECTRONICS

(75) Inventors: Wolfgang Schön, Langenargen (DE); Jürgen Kett, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 324 days.

(21) Appl. No.: 11/476,446

(22) Filed: Jun. 28, 2006

(65) Prior Publication Data
US 2007/0007829 A1    Jan. 11, 2007

(30) Foreign Application Priority Data
Jul. 9, 2005   (DE) .................. 10 2005 032 191

(51) Int. Cl.
*H02K 11/04* (2006.01)
(52) U.S. Cl. .................. 310/68 D; 310/71; 310/68 R
(58) Field of Classification Search ............. 310/71–72, 310/68 R, 68 D, 89, 52, 64, 254
See application file for complete search history.

(56) References Cited

U.S. PATENT DOCUMENTS

| | | | |
|---|---|---|---|
| 5,491,370 A * | 2/1996 | Schneider et al. ............. 310/54 |
| 5,713,427 A | 2/1998 | Lutz et al. | |
| 5,742,498 A * | 4/1998 | Taniguchi et al. ............ 363/145 |
| 6,107,711 A * | 8/2000 | Borchert .................... 310/68 D |
| 6,160,696 A * | 12/2000 | Bailey et al. ................. 361/115 |
| 6,448,676 B1 * | 9/2002 | Kershaw et al. ........... 310/68 R |
| 6,914,357 B2 * | 7/2005 | Tabatowski-Bush et al. .. 310/71 |
| 6,930,417 B2 * | 8/2005 | Kaneko et al. ................ 310/58 |
| 2003/0178896 A1 * | 9/2003 | Crane ........................ 310/68 R |
| 2004/0027014 A1 * | 2/2004 | Weigold et al. ........... 310/68 R |
| 2006/0181162 A1 * | 8/2006 | Pierret et al. .................. 310/58 |
| 2006/0284499 A1 * | 12/2006 | Rubbo et al. .............. 310/68 D |
| 2007/0007830 A1 * | 1/2007 | Reisch et al. ................ 310/54 |

FOREIGN PATENT DOCUMENTS

| DE | 44 04 791 C1 | 3/1995 |
|---|---|---|
| DE | 199 23 315 A1 | 11/2000 |

\* cited by examiner

*Primary Examiner*—Thanh Lam
(74) *Attorney, Agent, or Firm*—Davis & Bujold, P.L.L.C.

(57) ABSTRACT

The proposed electric machine with integrated power electronics is modularly constructed, it being possibly prefabricated and separately to install the parts stator carrier (2), control (10) for the power semiconductor DC+ (4), DC bars (5), power semiconductor (8), cooling duct (12) for power electronics and electric machine, stator (1) and stator winding (3).

7 Claims, 3 Drawing Sheets

ELECTRIC MACHINE WITH INTEGRATED POWER ELECTRONICS AND METHOD FOR PRODUCING THE BOND OF THE DC BARS WITH THE DC CONTACTS SURFACES OF THE POWER SEMICONDUCTOR OF THE POWER ELECTRONICS

This application claims priority from German Application Ser. No. 10 2005 032 191.7 filed Jul. 9, 2005.

FIELD OF THE INVENTION

This invention concerns an electric machine with integrated power electronics. The invention further relates to a method for producing the bond of the DC bars with the DC contact surfaces of the power semiconductor of the electronics of the electric machine, particularly of an inventive electric machine.

BACKGROUND OF THE INVENTION

Electric machines of this kind have been used in the prior art, among others in crankshaft-starter generators in hybrid vehicles where, in the power semiconductor is disposed, distributed on the periphery of the electric machine so as to make the connecting line to the electric machine as short as possible. Hybrid vehicles essentially have an internal combustion engine as a prime mover and they have, in addition, electric motors which make utilization of brake energy and driving with low emission possible.

From the Applicant's DE 199 23 315 A1 is known a driving system for a motor vehicle driven by a prime mover and having a transmission unit and at least one electric machine operable as motor and/or generator. The electric machine comprises at least one stator and one rotor with active parts which, having no housing of their own, are situated within a housing of the prime mover and/or of the transmission unit axially symmetrically and/or co-axially relative to an input chain shaft or a rotating part disposed parallel therewith and form with parts of the prime mover and/or of the transmission unit, a structural unit.

From DE 44 04 791 C1 is also known a structural unit consisting of an internal combustion engine comprising one crankshaft and one electric generator/motor of which the generator housing is firmly connected with the motor housing and the rotor is co-axially, non-rotatably connected with the crankshaft. Here an elastically deformable torque-transmitting disc is provided which is firmly flange mounted on the output side of the crankshaft and firmly connected with the rotor on the peripheral side. The rotor is also rotatably supported on the generator housing.

In the electric machines with integrated power electronics known from the prior art, the individual parts are interconnected by way of connecting devices, preferably by way of screws. Screws are needed, for example, for fastening the semiconductor module and the DC bars. This results in great expenditure of time for serial production due to the expensive assembly and the large number of manipulations, the same as in an increased additional installation space needed for the connection technology.

The necessary intermediate circuit capacity determined by the system has to be separately installed and adequately integrated which disadvantageously further increases the installation space required.

The problem on which this invention is based is to outline an electric machine with integrated power electronics in which the mentioned disadvantages of the electric machines with integrated power electronics known from the prior art can be overcome. The assemblage is to be specially simplified and the needed installation space minimized. Also to be outlined is a method for producing the bond of the DC bars with the DC contact surfaces of the power semiconductor of the power electronics, especially in an inventive electric machine.

SUMMARY OF THE INVENTION

A modularly constructed electric machine with integrated power electronics is accordingly proposed in which the parts stator carrier, control for the power semiconductor, positive DC bar, negative DC bar, power semiconductor, cooling duct for power electronics and electric machine, stator and stator winding are prefabricated and then separately installed. This modular design is made possible by the axially symmetrical shape of aid parts.

It is further proposed to construct the positive and negative DC bars so that radially observed they are disposed essentially superimposed, and axially observed they are essentially disposed parallel with each other. It is possible to situate an insulator between both bars. The side of both DC bars facing the insulator is roughened by suitable steps, such as by etching, whereby a large contact surface results. In this manner, the required intermediate circuit capacitor determined by the system is integrated in the power electronics.

With the scope of a specially advantageous development of the invention, it is provided that both DC bars and the insulator be constructed so that a snap-on connection results. In this way, the individual parts need only, in addition, to be moved superimposed, in the assembly, which results in the advantage that added fastening devices, such as screws, are eliminated.

The DC bars are bonded with the DC contact surfaces of the power semiconductor by the fact that when producing the power semiconductor a soldered layer or a layer of another adequate connecting medium is applied to the contact surfaces. After assemblage, it is possible to supply the electric machine and the power electronics with current for the first time. Due to the initially high ohmic resistance on the contact surfaces, heat generates by which the connection is produced. This leads to the lowering of the ohmic resistance on the contact power so that the system is prepared for regular operation. During the first current supply, the ohmic resistance (online) can optionally be measured in order to implement a quality control without added expense.

According to the invention, the end of the stator winding is designed as link which, after introducing the power electronic module, is bent up and preferably soldered with the AC contact surface during the previously described operation of the first supply of current.

Within the scope of another embodiment of the invention, the bond between the DC bars and the power semiconductor can also be produced by extruding. For the purpose, the semiconductor module and the DC bars can be constructed conically adapted to each other. By showing the individual parts, the fit into each other spans and is fixed by the snap-on connection described. The electric connection is produced by the surface pressure on the contact points. This procedure has the advantage that the process of supplying current for welding the connections is eliminated. In this embodiment, one more snap-on connection is needed between a DC bar and the power semiconductor.

BRIEF DESCRIPTION OF THE DRAWINGS

The invention will now be described, by way of example, with reference to the accompanying drawings in which.

DETAILED DESCRIPTION OF THE INVENTION

Figure 1:
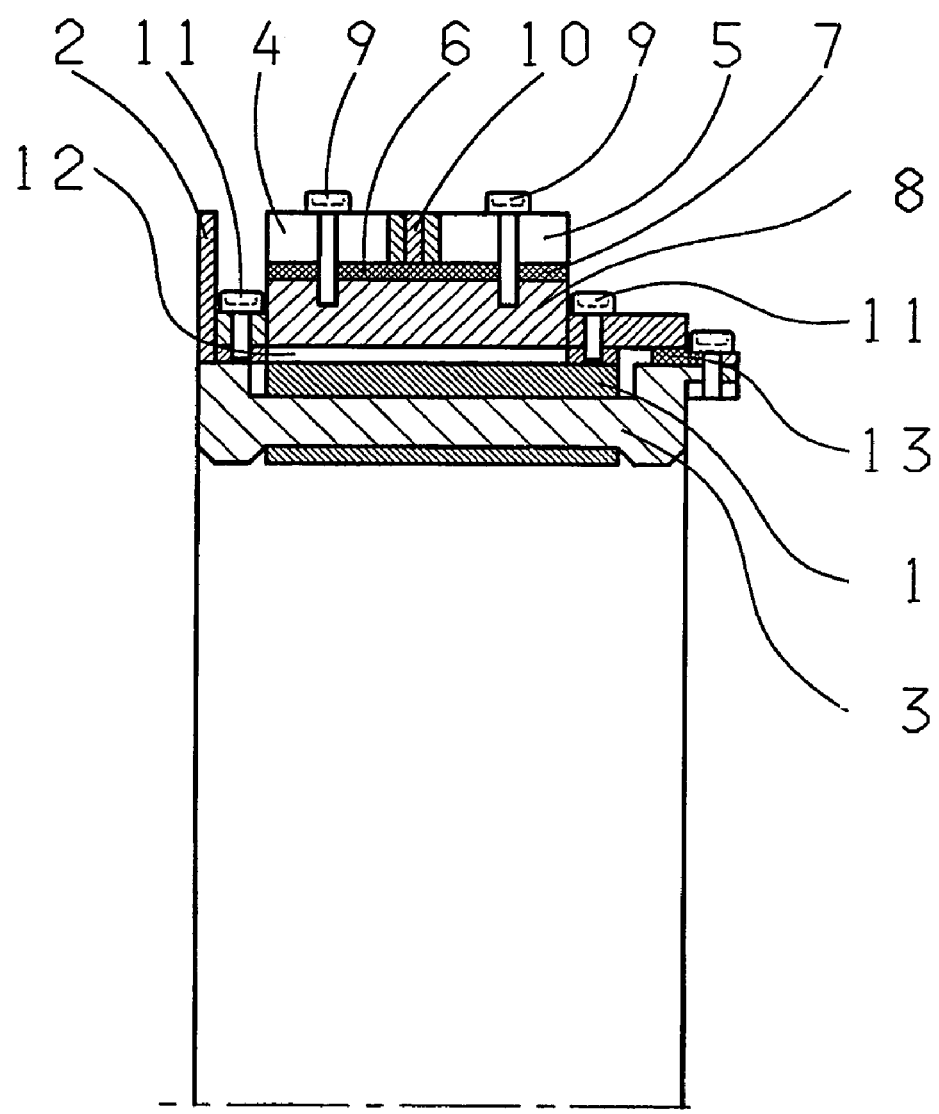
FIG. 1 is a diagrammatic representation of an electric machine with integrated power electronics according to the prior art.

In FIG. 1 is shown an electric machine with integrated power electronics as in the prior art. It comprises one stator 1, one stator carrier 2, one stator winding 3 and one semiconductor module fastened by way of screws 11 and having one positive DC bar 4, one negative DC bar 5, respectively connected with a power semiconductor 8 via one positive DC bond 6 and one negative DC bond 7. The DC bars 4, 5 are secured to the power semiconductor 8 via screws 9. Axially observed, a control 10 for the power semiconductor 9 is provided between the DC bars 4, 5. Radially observed is one cooling duct 12, provided between the stator 1 and the power semiconductor 8 for cooling the electric machine and the power electronics. In FIG. 1, an AC bond between the stator winding and the semiconductor module is designated with the reference numeral 13.

In the construction according to FIG. 1, connecting devices such as screws are needed for interconnecting the individual parts which results in considerable expenditure of time for serial production and in an increased additional installation space. These disadvantages are overcome by the inventive electric machine with integrated power electronics.

Figure 2:
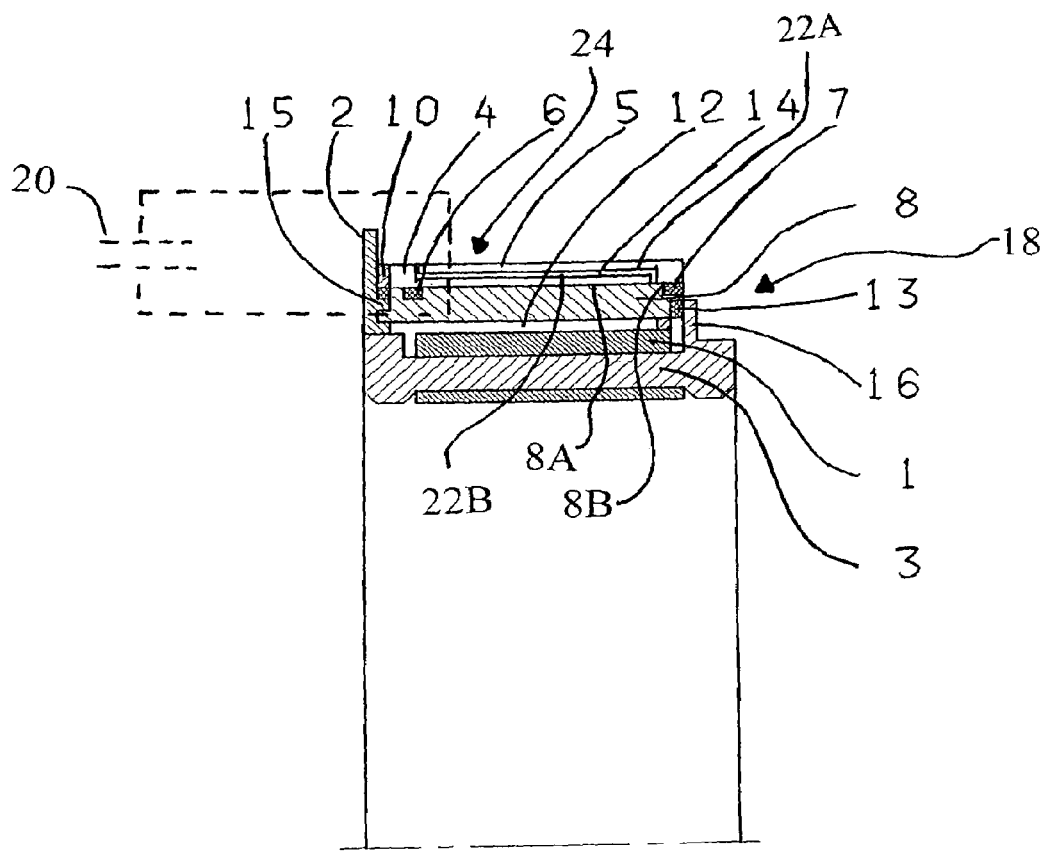
FIG. 2 is a diagrammatic representation of an electric machine with integrated power electronics according to a first embodiment of the instant invention.

A first embodiment of the invention is shown in FIG. 2. The parts stator carrier 2, control for the power semiconductor 10, positive DC bar 4, negative DC bar 5, power semiconductor 8, cooling duct 12 for power electronics and electric machine, stator 1 and stator winding 3 are prefabricated and separately installed wherein semiconductor module 18 includes DC bars 4, 5 and semiconductor 8.

As is to be understood from FIG. 2, the positive and negative DC bars 4, 5, radially observed, are disposed essentially superimposed and axially observed are disposed essentially parallel with each other. It is possible to situate an insulator 14 between both bars, thereby comprising the necessary intermediate circular capacitor 20 of the system, wherein intermediate capacitor 20 is indicated diagrammatically in FIGS. 2 and 3 by phantom lines to indicate that intermediate capacitor 20 is formed functionally by DC bars 4 and 5 and insulator 14 rather than being a separate capacitor.

According to the invention, the side of both DC bars 4, 5, facing the insulator 14, is roughened in order to implement large DC contact surfaces 22A and 22B between insulator 14 and DC bars 4, 5.

An end 16 of the stator winding 3 is preferably designed as a link which, after the power electronic module is inserted, is bent up and soldered with the power semiconductor 8. Combined with a plug connection 15, it is possible to fix the semiconductor module between the power semiconductor 8 and the stator carrier 2.

Both DC bars 4, 5 and the insulator 14 are advantageously designed to comprise a snap-on connection 24 formed by the mechanical configuration and fit of DC bars 4, 5 and insulator 14.

According to the invention, the bond 6 or 7 and the respective DC bars 4 and 5 with the DC contact surfaces 8A and 8B of the power semiconductor 8 can be produced by applying on the contact surfaces while producing the semiconductor 8 a soldered layer or a layer of any other suitable connection medium, the electric machine and the power electronics being supplied for the first time with current after the assemblage. By the heat generated on the contact surfaces by the initially high ohmic resistance, the connection or bond is produced, the ohmic resistance on the contact point then lowering so that the system is prepared for regular operation. During the first current supply, it is of particular advantage that the ohmic resistance (online) be measured in order to implement a quality control without added cost.

Figure 3:
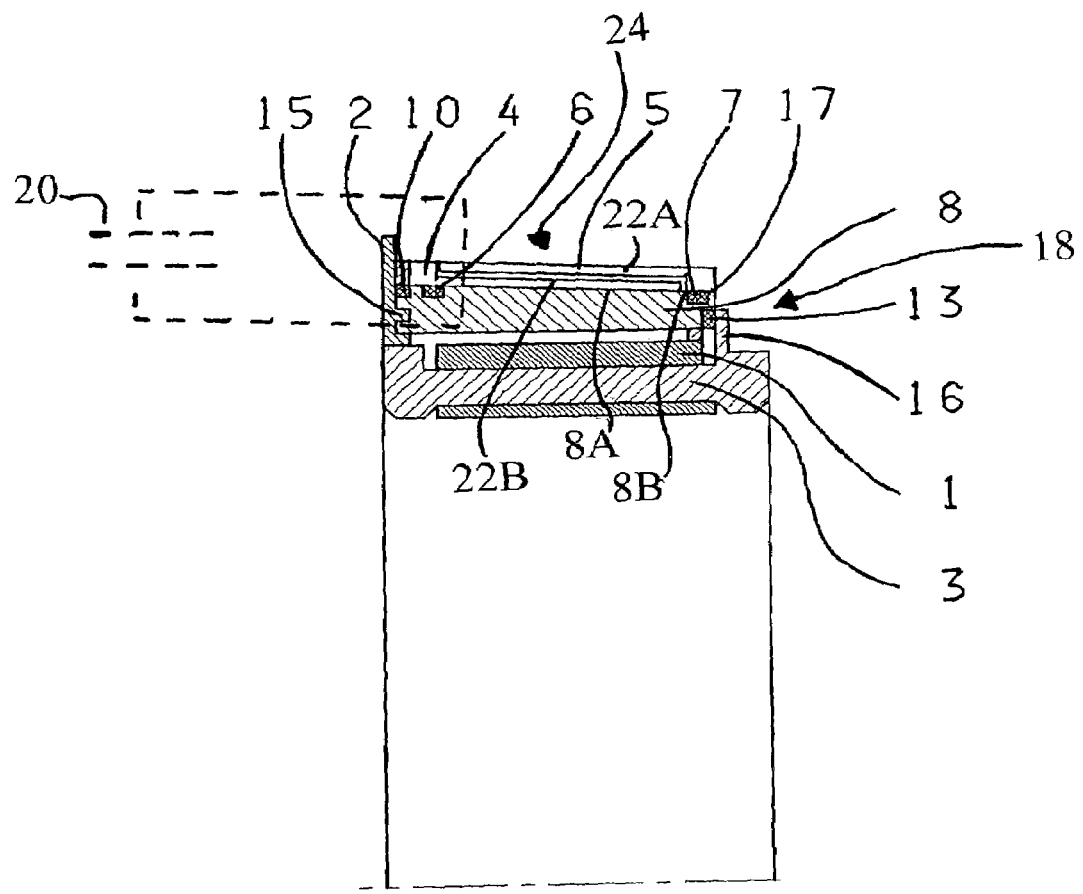
FIG. 3 is a diagrammatic representation of an electric machine with integrated power electronics according to a second embodiment of the invention.

Within the scope of an advantageous development of the invention, which is the object of FIG. 3, the bond between the DC bars 4, 5 and the power semiconductor 8 can be produced by extrusion. For the purpose, according to a specially advantageous embodiment of the invention, the semiconductor module and the DC bars 4, 5 can be conically configured adapting to each other so that by slipping on the individual parts the adaptation into each other is braced and fixed with the snap-on connection 24 above described. The electric connection is created by surface pressure on the contact points. In this embodiment, one other snap-on connection 17 is needed between the DC bar (it is the negative DC bar in the Figure) and the power semiconductor 8.

Any structural design, especially any spatial arrangement of the parts of the inventive electric machine with integrated power electronics and relative to each other and, insofar as technically significant, falls under the scope of protection of the instant claims without affecting the operation of the electric machine, even if those designs have not been explicitly shown in the Figures or in the description.

| | Reference numerals |
|---|---|
| 1 | stator |
| 2 | stator carrier |
| 3 | stator winding |
| 4 | positive DC bar |
| 5 | negative DC bar |
| 6 | positive DC bond |
| 7 | negative DC bond |
| 8 | power semiconductor |
| 9 | screw |
| 10 | control for the power semiconductor |
| 11 | screw |
| 12 | cooling duct |
| 13 | AC bond between stator winding and semiconductor module |
| 14 | insulator |
| 15 | plug connection between stator carrier & semiconductor module |
| 16 | end of the stator winding |
| 17 | snap-on connection |

The invention claimed is:

1. An electric machine with integrated power electronics, the electronic machine being modularly constructed and comprising:

a stator carrier (2), a power semiconductor control (10), a positive DC bar (4), a negative DC bar (5), a power semiconductor (8), and a cooling duct (12) for cooling the integrated power electronics, and the electric machine, a stator (1) and a stator winding (3), each of which is prefabricated and separately installed in the electric machine;

wherein the positive DC bar (4) and the negative DC bar (5) are located so as to be essentially superimposed when radially viewed along a rotational axis and so as to be essentially parallel when axially viewed normal to the rotational axis, and an insulator (14) is situated between the positive DC bar (4) and the negative DC bar (5) with contact surfaces (22A, 22B) between the insulator (14) and the positive DC bar (4) and the negative DC bar (5) so that the insulator (14), the positive DC bar (4) and the negative DC bar (5) together comprise an intermediate circular capacitor (20) for the power electronics.

2. The electric machine with integrated power electronics according to claim 1, wherein a side of the positive DC bar (4) and a side of the negative DC bar (5) facing the insulator (14) are roughened to provide sufficient contact surfaces (22A, 22B) to form the intermediate circular capacitor (20).

3. The electric machine with integrated power electronics according to claim 1, wherein the positive DC bar (4) and the negative DC bar (5) and the insulator (14) together form snap-on connections.

4. The electric machine with integrated power electronics according to claims 1, wherein an end (16) of the stator winding (3) is a link which, after insertion of the power electronic module, is bent up and soldered with the power semiconductor (8) such that when combined with a plug connection (15), a fixing of a semiconductor module is obtained between the power semiconductor (8) and the stator carrier (2).

5. The electric machine with integrated power electronics according to claim 1, wherein a bond (6) of the positive DC bar (4) and a bond (7) the negative DC bar (5) with a DC contact surface of the power semiconductor (8) is produced by an initial current supply of one of a soldered layer and a layer of any other suitable connecting medium applied on the contact surface during production of the power semiconductor (8), heat produced by an initial high ohmic resistance on the contact surface creating a band and a system being prepared for regular operation by subsequent lowering of ohmic resistance on contact power of the system.

6. The electric machine with integrated power electronics according to claim 5, wherein the bond (6) of the positive DC bar (4) and the bond (7) the negative DC bar (5) with DC contact surfaces of the power semiconductor (8) are produced by extrusion.

7. The electric machine with integrated power electronics according to claim 6, wherein the semiconductor module and the positive DC bar (4) and the negative DC bar (5) are communicate with a snap-on connections, an electric connection is produced by surface pressure on contact points and an other snap-on connection (17) is provided between one of the positive DC bar (4), the negative DC bar (5) and the power conductor (8).

* * * * *